D. D. McPHEE & G. C. JACKMAN.
VEHICLE SEAT.
APPLICATION FILED NOV. 25, 1916.

1,249,650.

Patented Dec. 11, 1917.

INVENTORS
George C. Jackman
Dougald D. McPhee
BY
L. L. Westfall
ATTORNEY

UNITED STATES PATENT OFFICE.

DOUGALD D. McPHEE AND GEORGE C. JACKMAN, OF SPOKANE, WASHINGTON.

VEHICLE-SEAT.

1,249,650.  Specification of Letters Patent.  Patented Dec. 11, 1917.

Application filed November 25, 1916. Serial No. 133,342.

*To all whom it may concern:*

Be it known that DOUGALD D. MCPHEE and GEORGE C. JACKMAN, citizens of the United States of America, residing at Spokane, in the county of Spokane and State of Washington, have invented certain new and useful Improvements in Vehicle-Seats, of which the following is a specification.

This invention pertains to seats for vehicles such as automobiles and the like, and has for its object to provide a seat that will leave the greatest amount of open space possible.

A further object is to provide a seat with a simply constructed means for adjusting the same backward and forward, valuable for suiting the position of the seat to the reach of the driver.

A further object is to provide a means for adjusting the angles of the back of the seat of the character described, and a still further object is to provide a seat of the character mentioned that can be folded and otherwise tilted and adjusted for weather protection, for room and other purposes.

Figure 1:
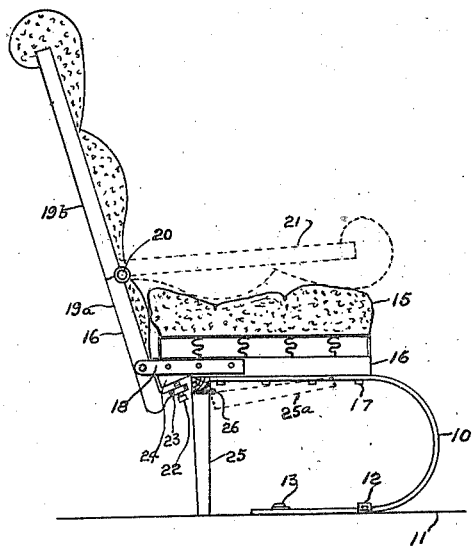
Figure 2:
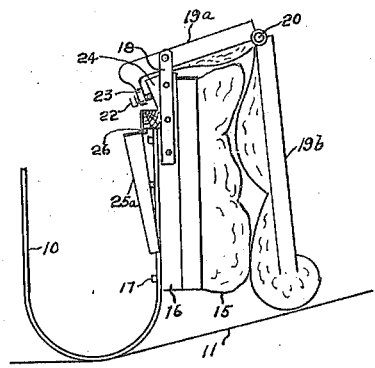
Figure 3:
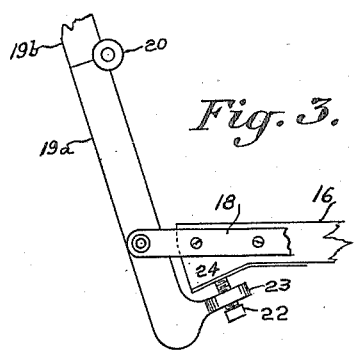
Figure 4:
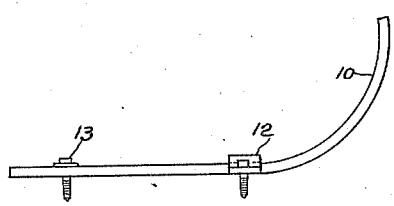
Figure 6:
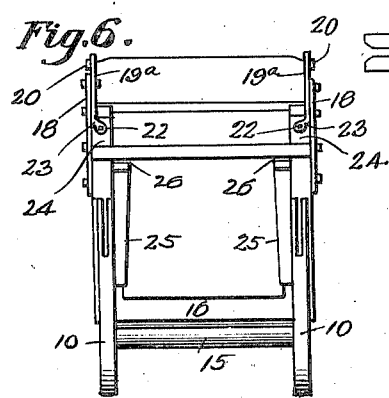
Figure 5:
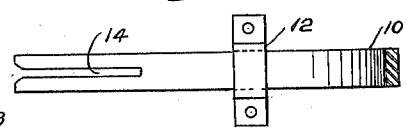

The particular description and operation of said invention will be hereinafter given and illustrated in the accompanying drawings, in which Figure 1, is a side view of the seat complete as mounted, a folded position of the back being shown by dotted lines, Fig. 2, is a side view of the seat complete in a folded and upturned position, Fig. 3, is a broken-away side view of the frame of the seat, illustrating the mechanism for adjusting the back of the seat, Fig. 4, is a broken-away side view of a spring used to support the seat, showing means for mounting the seat in such a manner that the same can be adjusted forward and backward, Fig. 5, is a top view of the same, and Fig. 6 is a rear view of the seat in a folded and upturned position.

In a detail description in which like numerals refer to like parts throughout the several views, a U shaped spring 10 is horizontally mounted, opening rearwardly. The spring 10 is adjustably secured to a base 11 by means of a guide 12 and a bolt 13 operating in an open slot 14. The seat cushion 15 rests upon a frame 16 secured to the U shaped spring 10 as by bolts or rivets 17. To the sides of the frame 16 and extending rearwardly are arms 18 to which are rotatably attached the back of the seat. The back is formed in two parts 19$^a$ and 19$^b$ connected and joined by hinges 20 so that the portion 19$^a$ will fold forwardly over the seat cushion 15 as shown by the dotted lines 21, Fig. 1. The angle of the back is made adjustable by means of a set screw 22 adjustable through a threaded aperture 23 extending inwardly from the back portion 19$^a$ and which has a bearing against a block 24 extending downwardly from the frame 16. The guide 12 and bolt 13 are fastened to the base 11 by means of their threaded ends shown in Fig. 4 and to which nuts may be attached.

When it is desired to adjust the seat forward or backward it is only necessary to loosen the bolt 13, when the seat can be readily moved, the spring 10 sliding through the guide 12. When adjusted to the desired position, the bolt 13 is then tightened, which holds the seat firmly in the new position.

The spring 10 is made sufficiently flexible to accommodate the weight of one person and to give a resilient effect when the vehicle to which the seat is attached is moving.

The use of the U shaped spring 10 as a support for the seat leaves almost an uninterrupted space underneath. By the tightening of the set screw 22 the back portions 19$^a$ and 19$^b$ are brought nearer to a perpendicular position and by the loosening of the screw the same are brought more to an angle rearwardly. The folding of the seat is effected by the manual drawing forwardly of the portion 19$^b$ of the back.

Ordinarily a spring 10 should be placed at each side of the frame 16, which would provide two springs to support an individual seat. We have provided foldable legs 25 rotatably secured to the frame 16 of the seat, as at 26, which may be turned to the down or vertical position shown when it is desired to support the rear side of the seat with the same. When the support of the same is not desired the same may be manually turned to the position of the dotted lines 25$^a$ and secured in that position by a suitable catch, not shown.

What is claimed is,

1. A vehicle seat comprising a pair of U shaped springs horizontally and slidably adjustable to a base, the U shaped springs opening rearwardly, a seat secured to the top of the same, a back secured to the rear of the seat and means for adjusting the angle of the back of the seat.

2. A vehicle seat comprising a U shaped spring horizontally adjusted to a base, a seat secured to the top of the same, a back secured to the rear of the seat and means for adjusting the angle of the same.

In testimony whereof we affix our signatures in presence of two witnesses.

DOUGALD D. McPHEE.
GEORGE C. JACKMAN.

Witnesses:
H. M. WILEY,
L. L. WESTFALL.